(12) United States Patent
Niitsuma et al.

(10) Patent No.: US 9,788,535 B2
(45) Date of Patent: Oct. 17, 2017

(54) WATERPROOF STRUCTURE FOR A FISHING REEL

(71) Applicant: Shimano Inc., Sakai, Osaka (JP)

(72) Inventors: Akira Niitsuma, Osaka (JP); Takeshi Ikuta, Osaka (JP); Kunio Takechi, Osaka (JP); Yutaka Inoue, Osaka (JP)

(73) Assignee: Shimano Inc., Osaka (JP)

( * ) Notice: Subject to any disclaimer, the term of this patent is extended or adjusted under 35 U.S.C. 154(b) by 109 days.

(21) Appl. No.: 14/868,013

(22) Filed: Sep. 28, 2015

(65) Prior Publication Data

US 2016/0106083 A1   Apr. 21, 2016

(30) Foreign Application Priority Data

Oct. 17, 2014   (JP) .................................. 2014-213180

(51) Int. Cl.
*A01K 89/01* (2006.01)
*A01K 89/015* (2006.01)

(52) U.S. Cl.
CPC ................................ *A01K 89/0192* (2015.05)

(58) Field of Classification Search
CPC ............ A01K 89/01; A01K 89/011221; A01K 89/015; A01K 89/01928
See application file for complete search history.

(56) References Cited

U.S. PATENT DOCUMENTS

| 4,585,182 A * | 4/1986 | Atobe | A01K 91/20 242/223 |
| 5,415,359 A * | 5/1995 | Ikuta | A01K 89/015 242/271 |
| 6,045,073 A * | 4/2000 | Ikuta | A01K 89/033 242/260 |
| 6,102,317 A * | 8/2000 | Bernard | A01K 89/01 242/311 |
| 6,149,089 A * | 11/2000 | Matsuda | A01K 89/01 242/246 |
| 6,412,720 B1 * | 7/2002 | Ikuta | A01K 89/015 242/269 |

(Continued)

FOREIGN PATENT DOCUMENTS

| JP | 2000262195 A * | 3/1999 | .......... F16C 32/0406 |
| JP | 2004-180530 A1 | 7/2004 | |

*Primary Examiner* — Emmanuel M Marcelo
(74) *Attorney, Agent, or Firm* — Global IP Counselors, LLP (57) ABSTRACT

The waterproof structure includes a reel body, a spool, a first abutting member, and a second abutting member. The first abutting member includes a first body portion and at least one first annular protrusion. The first body portion abuts with the reel body. The first annular protrusion protrudes from the first body portion. The second abutting member includes a second body portion and at least one second annular protrusion. The second body portion abuts with the spool and is adjacently disposed at a predetermined first waterproof gap from the first annular protrusion. The second annular protrusion protrudes from the second body portion and is adjacently disposed at a predetermined second gap from the first body portion. The first annular protrusion and the second annular protrusion are adjacently disposed with a predetermined second waterproof gap therebetween.

9 Claims, 9 Drawing Sheets

(56) References Cited

U.S. PATENT DOCUMENTS

| | | | |
|---|---|---|---|
| 2003/0111569 A1* | 6/2003 | Hitomi | A01K 89/00 242/321 |
| 2005/0211812 A1* | 9/2005 | Nakagawa | A01K 89/015 242/223 |
| 2006/0016924 A1* | 1/2006 | Hirayama | A01K 89/006 242/245 |
| 2008/0173745 A1* | 7/2008 | Takechi | A01K 89/015 242/321 |

* cited by examiner

WATERPROOF STRUCTURE FOR A FISHING REEL

CROSS-REFERENCE TO RELATED APPLICATIONS

This application claims priority based on Japanese Patent Application No. 2014-213180, filed in Japan Patent Office on Oct. 17, 2014, the contents of which is hereby incorporated herein by reference.

BACKGROUND

Field of the Invention

The present invention relates to a waterproof structure for a fishing reel.

Background Information

Conventional fishing reels include those to which a waterproof structure is provided, for example, a dual-bearing reel (refer to Japanese Published Unexamined Application No. 2004-180530). In this waterproof structure, waterproof walls 23a, 28, 31Bb and recessed annular grooves 23b, 26 form a surrounding wall with a labyrinth structure (a structure in which numerous irregularities are formed continuously), in conjunction with a tubular portion 23, a cover member 24, and a second drag pressing member 31B. Water that intrudes from a gap between the spool 2 and the reel body 1a is dammed in multiple stages by this surrounding wall with a labyrinth structure, which prevents the intrusion of water into the controller of the drag mechanism (refer to paragraph 24).

SUMMARY

In the waterproof structure described above, water that intrudes from a gap between the spool 2 and the reel body 1a is dammed in multiple stages by a surrounding wall with a labyrinth structure. Specifically, a maze-like passage is formed to restrict the intrusion of water into the drag mechanism by providing a plurality of waterproof walls 23a, 28, 31Bb and a plurality of recessed annular grooves 23b, 26, with respect to the tubular portion 23, the cover member 24, and the drag pressing member 31B.

However, in order to form a maze-like passage, forming the tubular portion 23, the cover member 24, and the drag pressing member 31B into a special shape is necessary. That is, each of the plurality of members that configure the labyrinth structure had to be formed into a complex shape. For this reason, in a conventional labyrinth structure, precisely molding of each member, as well as precisely assembling the members, was difficult.

Additionally, in the waterproof structure described above, two recessed annular grooves 23b, 26 are formed in order to form a water releasing passage. However, since the intruding water is temporarily captured in the grooves 23b, 26, there is the problem that, if the spool is rotated, the water that is captured in these grooves 23b, 26 goes over the waterproof walls 23a and 28 due to this rotation.

The present invention was made in light of the problems described above, and an object of the present invention is to provide a simpler configuration of a waterproof structure for a fishing reel.

The waterproof structure for a fishing reel according to a first embodiment comprises a reel body, a rotating member, a first abutting member, and a second abutting member. The rotating member rotates around a rotational axis with respect to the reel body. The first abutting member comprises a first body portion and at least one first annular protrusion. The first body portion can be abutted to the reel body. The first annular protrusion protrudes from the first body portion. The second abutting member comprises a second body portion and at least one second annular protrusion. The second body portion can be abutted to the rotating member and is adjacently disposed at a predetermined first gap from the first annular protrusion. The second annular protrusion protrudes from the second body portion and is adjacently disposed at a predetermined second gap from the first body portion. The first annular protrusion and the second annular protrusion are adjacently disposed with a predetermined third gap therebetween.

In the waterproof structure of the present fishing reel, the first abutting member can be abutted to the reel body at the first body portion. The second abutting member can be abutted to the rotating member at the second body portion. Here, the first body portion of the first abutting member is disposed adjacent the second annular protrusion, at a predetermined second gap from the second annular protrusion. Furthermore, the second body portion of the second abutting member is disposed adjacent the first annular protrusion, at a predetermined first gap from the first annular protrusion. The first annular protrusion and the second annular protrusion are also adjacently disposed with a predetermined third gap therebetween.

In this manner, a first to a third gap can be disposed between the first abutting member and the second abutting member by forming a first annular protrusion in the first body portion of the first abutting member and forming a second annular protrusion in the second body portion of the second abutting member. Fluid that has intruded between the reel body and the rotating member can thereby be waterproofed. That is, a waterproof structure can be easily realized by simply forming a first annular protrusion in the first body portion of the first abutting member and forming a second annular protrusion in the second body portion of the second abutting member.

In the waterproof structure for a fishing reel according to a second embodiment, a water repellent treatment is applied to at least one of the first abutting member or the second abutting member in the waterproof structure recited in the first embodiment.

In this embodiment, since a water repellent treatment is applied to at least one of the first abutting member or the second abutting member, fluid has difficulty intruding into the first to the third gaps between the first abutting member and the second abutting member. That is, the waterproof effect of the waterproof structure can be improved.

In the waterproof structure for a fishing reel according to a third embodiment, in the waterproof structure recited in the first or the second embodiment, a first annular protrusion and a second annular protrusion are formed in a different diameter concentric annular shape, which is concentric around a rotational axis having different diameters.

In this embodiment, since the first annular protrusion and the second annular protrusion are formed in an annular shape, the first annular protrusion and the second annular protrusion can be easily formed. Furthermore, since the first annular protrusion and the second annular protrusion are concentric around a rotational axis and have different diameters, the first annular protrusion and the second annular protrusion can be easily disposed adjacently and alternately in the radial direction. That is, the first annular protrusion and the second annular protrusion can be easily assembled.

In the waterproof structure for a fishing reel according to a fourth embodiment, in the waterproof structure recited in any one of the first to the third embodiments, a wall portion that protrudes in the radial direction away from the rotational axis is further disposed on at least one of the first annular protrusion at the maximum diameter or the second annular protrusion at the maximum diameter.

In this embodiment, fluid that intrudes between the reel body and the rotating member becomes less likely to intrude into the first to the third gaps due to the wall portion that protrudes in the radial direction. That is, the intrusion of fluid to the first into the third gaps can be restricted.

In the waterproof structure for a fishing reel according to a fifth embodiment, in the waterproof structure recited in any one of the first to the fourth embodiments, a flow guide portion for guiding the fluid that intrudes between the reel body and the rotating member in the direction of gravity is further disposed on at least one of the first abutting member and the second abutting member.

In this embodiment, since fluid that intrudes between the reel body and the rotating member can be guided in the direction of gravity with the flow guide portion, intrusion of fluid into the first to the third gaps can be restricted.

In the waterproof structure for a fishing reel according to a sixth embodiment, in the waterproof structure recited in the fifth embodiment, the flow guide portion comprises a first flow guide portion that is disposed on the outer peripheral surface of at least one of the first annular protrusion at the maximum diameter or the second annular protrusion at the maximum diameter.

In this embodiment, since the fluid that is on the outer peripheral surface at the first annular protrusion at the maximum diameter and/or the fluid on the outer peripheral surface at the second annular protrusion at the maximum diameter can be guided in the direction of gravity with the first flow guide portion, intrusion of fluid into the first to the third gaps can be reliably restricted.

In the waterproof structure for a fishing reel according to a seventh embodiment, in the waterproof structure recited in the fifth or the sixth embodiment, the flow guide portion comprises a second flow guide portion that is disposed on at least one of the first body portion or the second body portion.

In this embodiment, since fluid between the first body portion and/or the second body portion can be guided in the direction of gravity with the second flow guide portion, intrusion of fluid into the first to the third gaps can be reliably restricted.

In the waterproof structure for a fishing reel according to an eighth embodiment, in the waterproof structure recited in the seventh embodiment, the first body portion further comprises a first abutting portion that is abutted with the reel body. The second body portion further comprises a second abutting portion that is abutted with the rotating member. The second flow guide portion is disposed on at least one of the first abutting portion or the second abutting portion.

In this embodiment, fluid between rotating member and the first abutting portion and/or the second abutting portion can be guided in the direction of gravity with the second flow guide portion. Accordingly, the intrusion of fluid into the first to the third gaps can be more reliably restricted.

In the waterproof structure for a fishing reel according to a ninth embodiment, in the waterproof structure recited in the any one of the fifth to the eighth embodiments, the reel body further comprises a discharge portion. The discharge portion discharges the fluid that is guided by the flow guide portion to the outside of the reel body.

In this embodiment, the fluid that is guided by the flow guide portion is discharged to the outside of the reel body via the discharge portion. Accordingly, the intrusion of fluid into the first to the third gaps can be more reliably restricted.

According to the present invention, a simple configuration of a waterproof structure for a fishing reel can be provided.

BRIEF DESCRIPTION OF THE DRAWINGS

Referring now to the attached drawings which form a part of this original disclosure.

DETAILED DESCRIPTION OF THE EMBODIMENTS

Overall Structure of the Dual-Bearing Reel

Figure 1:
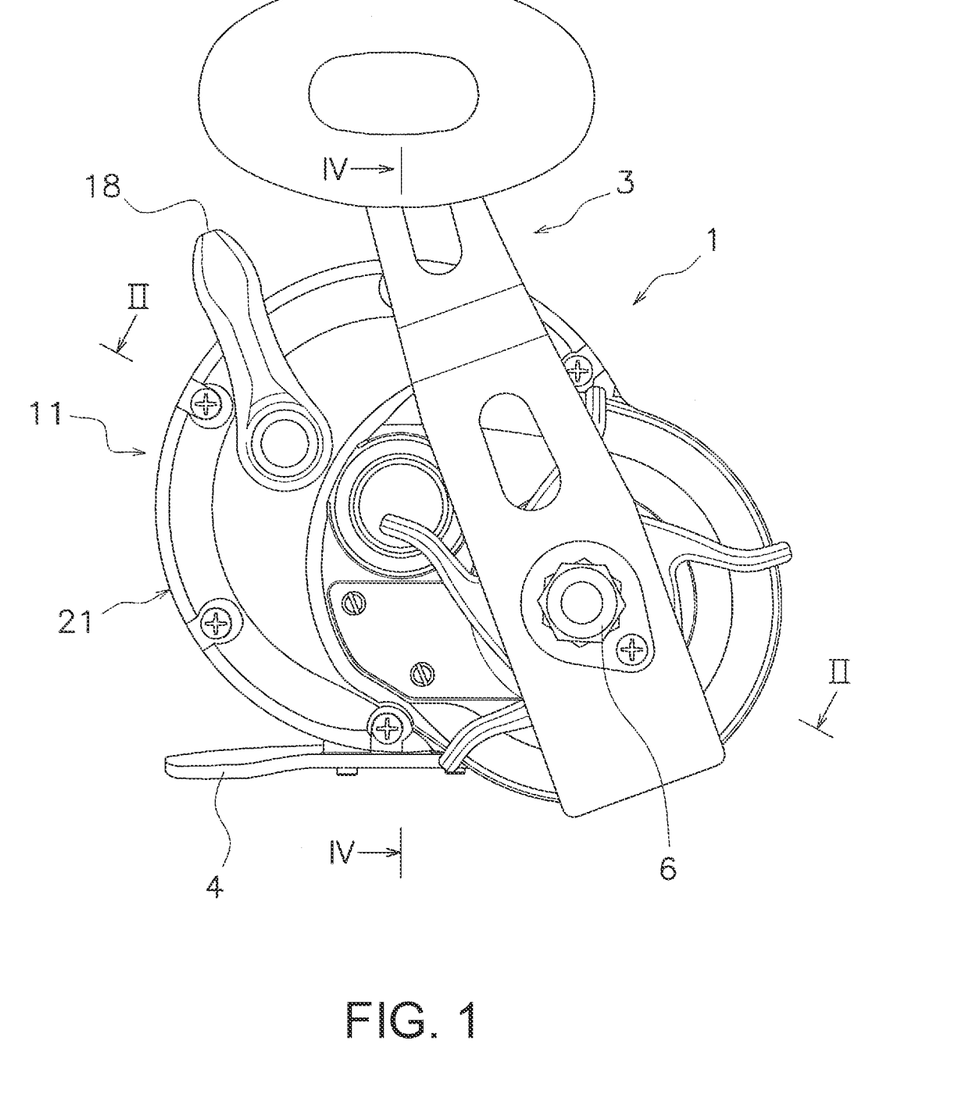
FIG. 1 is a side view of a dual-bearing reel employing a first embodiment of the present invention.
Figure 2:
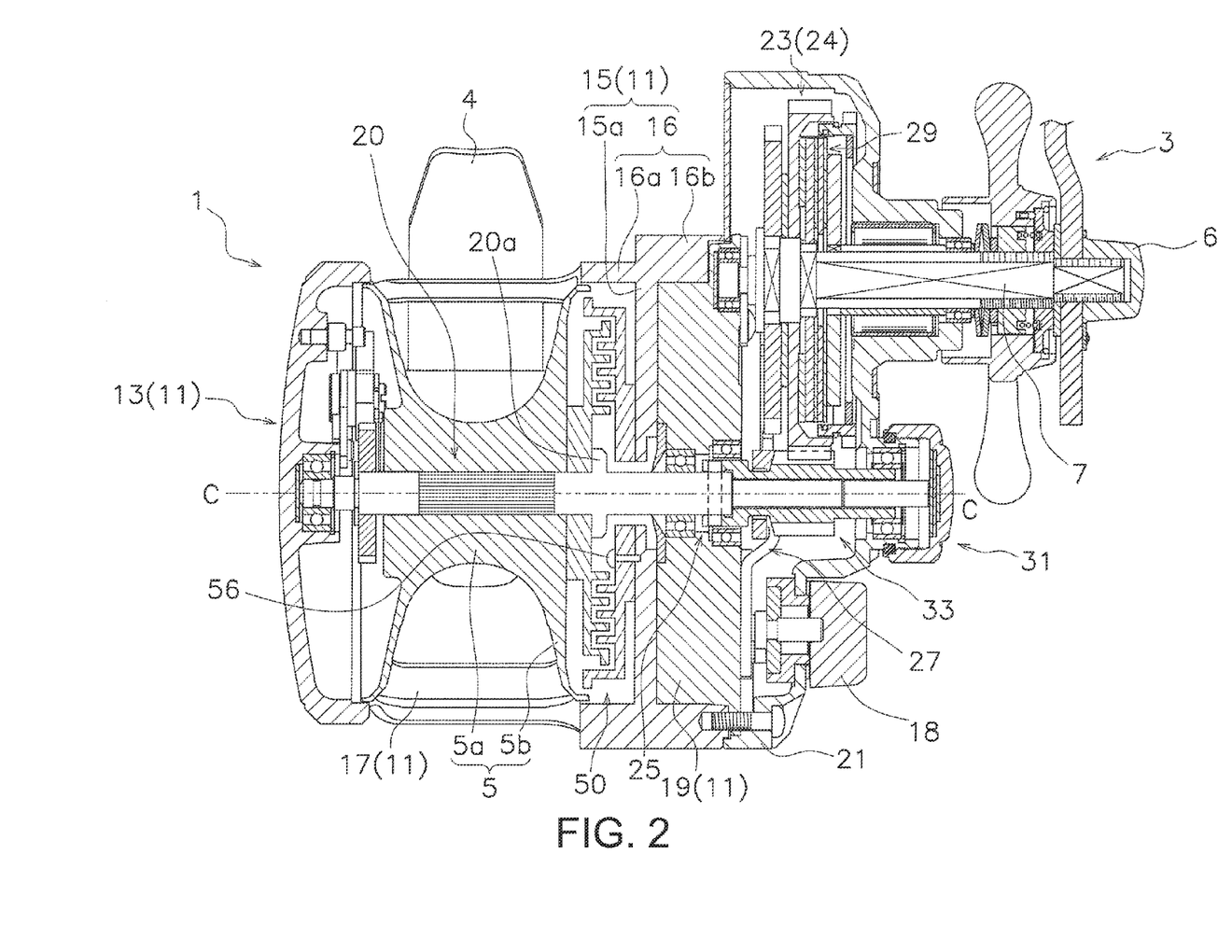
FIG. 2 is a cross-sectional view of the section line II-II in FIG. 1.

In FIG. 1 and FIG. 2, the dual-bearing reel that employs the first embodiment of the present invention comprises a reel body 1, a handle 3, and a spool 5.

Regarding the front, rear, left, and right referred to in the following description, the direction in which the fishing line is unreeled in a state in which the dual-bearing reel is mounted to the fishing rod is the front, while the left and right are represented in a state viewing the dual-bearing reel from the rear.

The handle 3 is disposed on the side of the reel body 1 in order to rotate the spool 5. The handle 3 is mounted to the distal end of a handle shaft 7 via a fixing member, such as a nut 6, so as to be integrally rotatable.

The reel body 1 comprises a first side cover 13, a side plate 15, a plurality of connecting portions 17, a mechanism mounting plate 19, and a second side cover 21. Here, a frame 11 is configured by the first side cover 13, the side plate 15, the plurality of connecting portions 17, and the mechanism mounting plate 19.

The first side cover 13 is disposed at a predetermined interval from the side plate 15. The first side cover 13 rotatably supports the left end of a spool shaft 20 described below.

The side plate 15 is disposed between the first side cover 13 and the mechanism mounting plate 19. The side plate 15 comprises a side plate body 15*a* and a tubular portion 16.

The side plate body 15a is formed substantially in a disc-shape, with a hole in the center thereof.

The tubular portion 16 is integrally formed on the outer peripheral part of the side plate body 15a. The tubular portion 16 comprises a first tubular portion 16a and a second tubular portion 16b. The first tubular portion 16a is a portion extending to the spool 5 side. A waterproof structure 50 (described below) is disposed on the inner peripheral part of the first tubular portion 16a. The second tubular portion 16b is a portion extending to the spool 3 side. The mechanism mounting plate 19 is disposed on the inner peripheral part of the second tubular portion 16b.

The plurality of connecting portions 17 is integrally formed with the first side cover 13 and the side plate 15, connecting the first side cover 13 and the side plate 15. A rod mounting leg portion 4 for mounting the dual-bearing reel on the fishing rod is mounted to the connecting portion 17 that is formed below.

The mechanism mounting plate 19 is disposed between the side plate 15 and the second side cover 21 on the inner peripheral side of the second tubular portion 16b. The mechanism mounting plate 19 is mounted on the side plate 15, for example, on the side plate body 15a.

The second side cover 21 rotatably supports the handle shaft 7. The second side cover 21 is mounted to the mechanism mounting plate 19. A clutch lever 18 is mounted to the rear of the second side cover 21.

The handle shaft 7 is rotatably mounted to the mechanism mounting plate 19 and the second side cover 21. The handle shaft 7 is prohibited from rotating in the casting direction (reverse rotation).

A waterproof structure 50 is disposed between the above-described frame 11 and the spool 5. Specifically, the waterproof structure 50 is disposed between the mechanism mounting plate 19 of the frame 11 and the spool 5, and the inner peripheral part of the first tubular portion 16a of the frame 11. The configuration of the waterproof structure 50 is described below.

Between the second side cover 21 and the mechanism mounting plate 19 are mainly disposed a gear mechanism 23, a clutch mechanism 25, a clutch control mechanism 27, a drag mechanism 29, and a casting control mechanism 31.

The gear mechanism 23 transmits the rotational force from the handle 3 to the spool 5 via the handle shaft 7. The gear mechanism 23 comprises a main gear 24. The main gear 24 is fixed to the handle shaft 7.

The clutch mechanism 25 connects and disconnects the handle 3 and the spool 5. The clutch control mechanism 27 moves a pinion gear 33 in the axial direction in response to an operation of the clutch lever 18. The clutch mechanism 25 is thereby set to a clutch-on state (connected state) and a clutch-off state.

The drag mechanism 29 slows the rotation of the spool 5 in the casting direction. The casting control mechanism 31 adjusts the resistive force during the rotation of the spool 5.

The spool 5 rotates with respect to the reel body 1, with the rotational axis C of the spool shaft 20 as the center. Specifically, the spool 5 is rotatably mounted inside of the reel body 1 via the spool shaft 20. The spool 5 is non-rotatably fixed to the spool shaft 20.

The spool 5 comprises a line winding cylinder part 5a and a pair of flanges 5b. The cylinder part 5a is a portion to which the fishing line is wound. The line winding cylinder part 5a is disposed between the pair of flanges 5b.

The pair of flanges 5b is integrally formed on the two ends of the line winding cylinder part 5a. A slight gap is formed between the outer peripheral part of the first side cover 13 and the outer peripheral surface of one of the flanges 5b (the outer peripheral surface of the flange 5b on the left side in FIG. 2). Additionally, a slight gap is formed between the first tubular portion 16a of the side plate 15 and the outer peripheral surface of the other flange 5b (the outer peripheral surface of the flange 5b on the right side in FIG. 2).

The spool shaft 20 is disposed to be parallel to the handle shaft 7. The spool shaft 20 is rotatably supported by the reel body 1, for example, to the first side cover 13 and the mechanism mounting plate 19. The spool shaft 20 comprises a flange-like positioning portion 20a. The positioning portion 20a is for positioning the second abutting member 61 of the waterproof structure 50 (described below). The positioning portion 20a extends in the circumferential direction of the spool shaft 20 and is integrally formed on the spool shaft 20.

The pinion gear 33 meshes with the main gear 24 of the gear mechanism 23. The pinion gear 33 is a tubular member through which the spool shaft 20 extends. The pinion gear 33 is rotatably supported by the reel body 1, for example, to the mechanism mounting plate 19 and the second side cover 21. The pinion gear 33 is movably mounted in the axial direction with respect to the spool shaft 20. The clutch mechanism 25 is configured by the pinion gear 33 and the spool shaft 20.

Configuration of the Waterproof Structure

Figure 3:
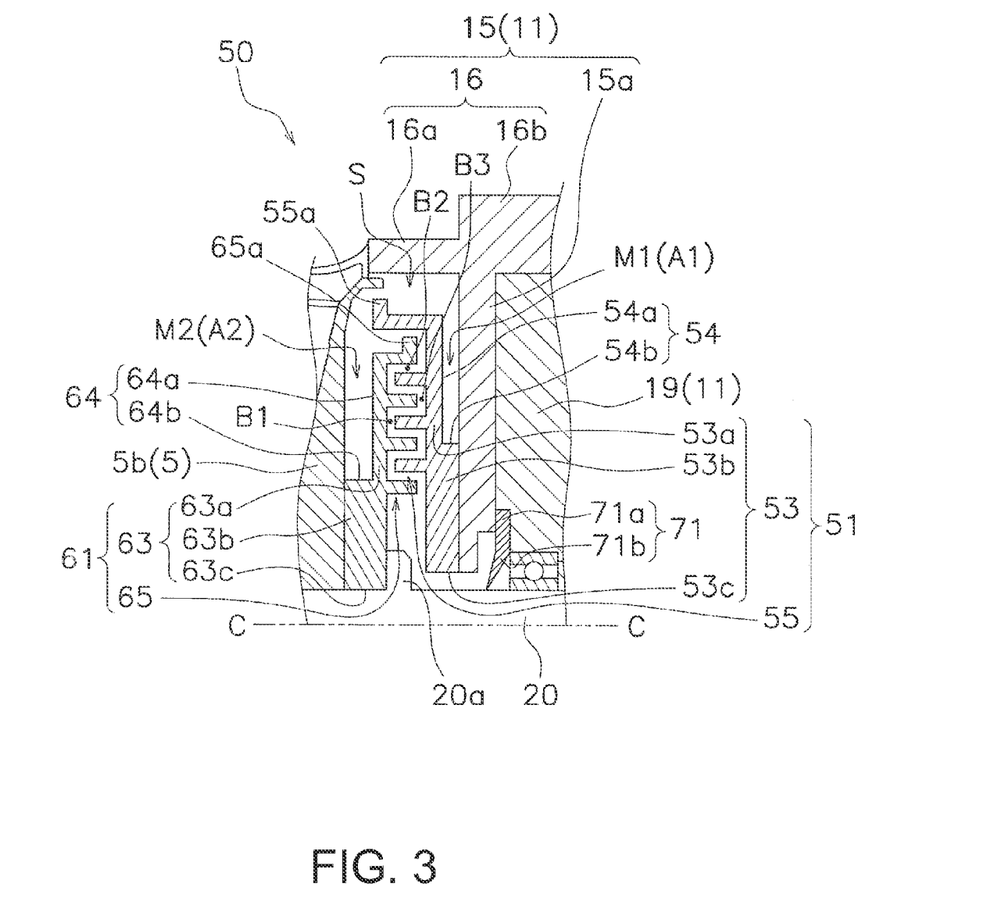
FIG. 3 is a partial, enlarged cross-sectional view of the waterproof structure in FIG. 2.
Figure 4:
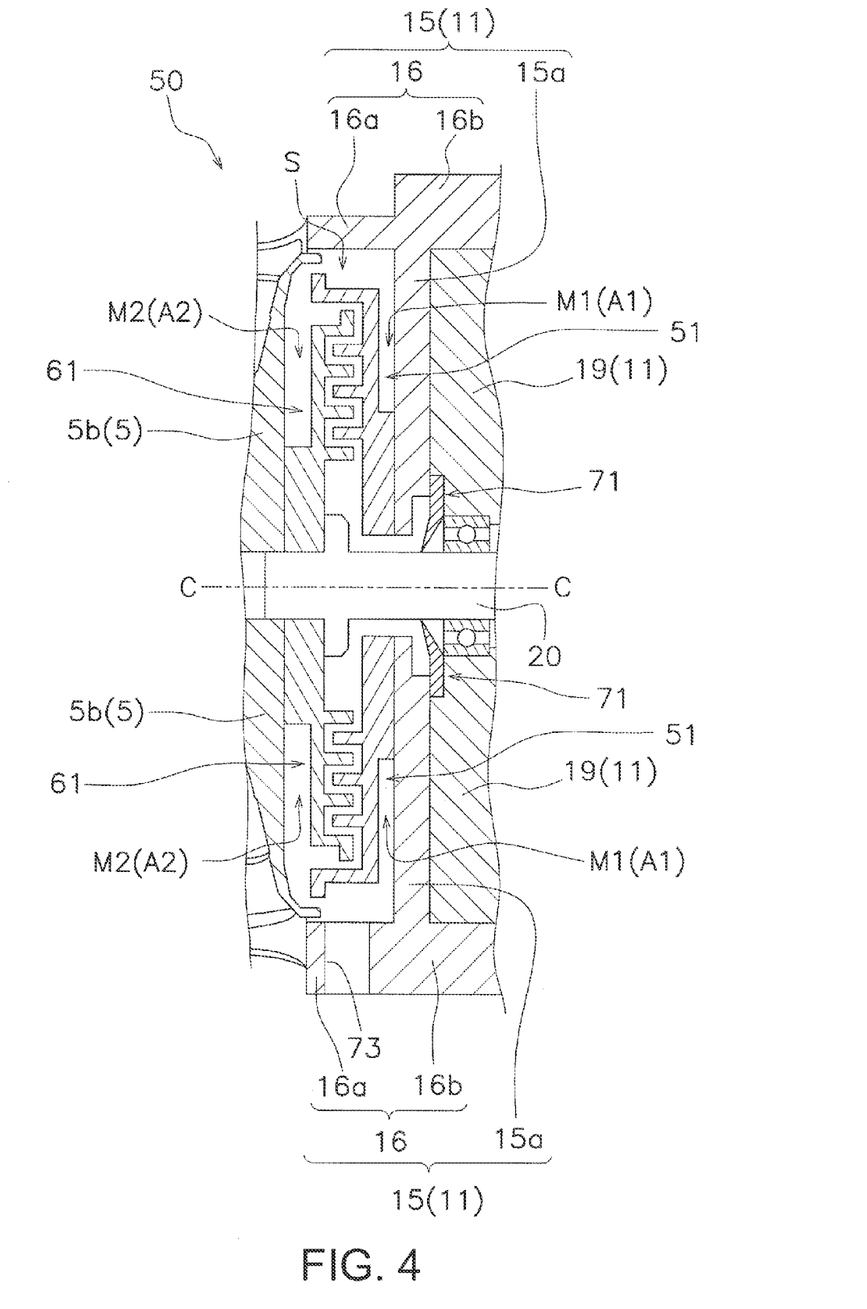
FIG. 4 is a partial, enlarged cross-sectional view along the section line IV-IV of FIG. 1.

As shown in FIG. 2 to FIG. 4, the waterproof structure 50 comprises a reel body 1, a spool 5, a first abutting member 51, a second abutting member 61, a seal member 71, and a discharge hole 73.

Here, the first abutting member 51, in conjunction with the second abutting member 61, restricts the intrusion of water (one example of a fluid) into the internal structure of the reel body 1. For example, a labyrinth structure is configured by the first abutting member 51 and the second abutting member 61. The labyrinth structure will be described below.

FIG. 2 to FIG. 4 show a first to a third waterproof gap B1, B2, B3 (described below); these first to the third waterproof gaps B1, B2, B3 are shown enlarged in order to facilitate the description.

The spool 5 is rotatably disposed on the reel body 1, as described above. As shown in FIG. 3, the first abutting member 51 is abutted to the reel body 1, for example, the frame 11, and is disposed opposing the second abutting member 61. Specifically, the first abutting member 51 is mounted to the reel body 1, for example, the frame 11. A water repellent treatment is applied to the first abutting member 51.

The first abutting member 51 comprises a first body portion 53 and a plurality of first annular protrusions 55. The first body portion 53 abuts with to the reel body 1.

The first body portion 53 comprises a first disc portion 53a and a first abutting portion 53b. The first disc portion 53a is formed in a disc shape, and a first hole 53c is formed in the center thereof. The spool shaft 20 is inserted on the inner peripheral side of the first hole 53c. The inner peripheral surface of the first hole 53c is disposed at a predetermined interval from the outer peripheral surface of the spool shaft 20.

The first abutting portion 53b is a portion that is abutted to the reel body 1. The first abutting portion 53b is integrally formed to the first disc portion 53a. Specifically, the first abutting portion 53b is formed in a cylindrical shape, and the inner peripheral part thereof configures the first hole 53c described above. The first abutting portion 53b protrudes from the first disc portion 53a toward the reel body 1, in a first direction along the spool shaft 20 (direction along the axial center of the spool shaft 20). The first abutting portion 53b abuts the side plate 15 of the reel body 1 (side plate body 15a). The first abutting portion 53b and the inner peripheral part of the first disc portion 53a are fixed to the side plate 15 by a fixing member, for example, a screw member 56 (refer to FIG. 2).

A first stepped portion 54 (one example of a flow guide portion; one example of the second flow guide portion) is provided to the first abutting portion 53b. The first stepped portion 54 can guide the water that intrudes into a space S between the reel body 1 and the spool 5 in the direction of gravity, without retaining the water.

The first stepped portion 54 comprises a first opposing portion 54a (one example of the third wall portion) and a first bottom portion 54b. The first opposing portion 54a corresponds to the side surface of the reel body 1 side of the first disc portion 53a. The first opposing portion 54a and the reel body 1 form a predetermined first guide gap A1 in the first direction. Specifically, the first opposing portion 54a is disposed opposing the reel body 1, for example, the side plate 15, in the first direction. A predetermined first guide gap A1 is thereby formed between the first opposing portion 54a and the side plate 15.

The first bottom portion 54b is disposed on the outer peripheral part of the first abutting portion 53b. That is, the first bottom portion 54b is disposed on the outer peripheral surface of the first abutting portion 53b. The first bottom portion 54b, the first opposing portion 54a, and the side plate 15 of the reel body 1 (side plate body 15a) form a first groove portion M1. The first groove portion M1 opens in a second direction that is away from the spool shaft 20 (in a direction away from the axial center of the spool shaft 20) and is formed in a groove shape along the outer peripheral part of the first abutting portion 53b. With this first groove portion M1, water that intrudes into the space S is guided around the spool shaft 20.

A plurality of (for example, four) first annular protrusions 55 are integrally formed on the first body portion 53. Specifically, each of the plurality of first annular protrusions 55 protrudes from the first disc portion 53a of the first body portion 53. Each of the plurality of first annular protrusions 55 is disposed at a predetermined first waterproof gap B1 (one example of the first gap) from the second body portion 63 of the second abutting member 61 (second disc portion 63a; described below).

Each of the plurality of first annular protrusions 55 is formed in an annular shape. The plurality of first annular protrusions 55 are concentric with respect to the rotational axis C, and they have diameters that are different from each other. In other words, each of the plurality of first annular protrusions 55 is formed with a different diameter, but with a concentric annular shape.

Each of the plurality of first annular protrusions 55 is integrally formed on the first disc portion 53a of the first body portion 53 at predetermined intervals in the second direction. The second annular protrusion 65 of the second abutting member 61 (described below) is adjacently disposed between first annular protrusions 55 that are adjacent to each other in the second direction. A predetermined second waterproof gap B2 (one example of the third gap) is thereby disposed between the first annular protrusion 55 and the second annular protrusion 65 that are adjacent to each other in the second direction.

A first wall portion 55a that protrudes in the second direction is disposed on the first annular protrusion 55 that is on the outermost side in the second direction (the first annular protrusion 55 with the maximum diameter). In other words, a first wall portion 55a that protrudes in the radial direction away from the rotational axis C of the spool shaft 20 is disposed on the first annular protrusion 55 with the maximum diameter. The first wall portion 55a restricts the intrusion of water between the first abutting member 51 and the second abutting member 61.

Specifically, the first wall portion 55a is formed in a flange shape on the outer peripheral part of the first annular protrusion 55 with the maximum diameter, extending toward the spool 5. Intrusion of water into the second guide gap A2 and/or the second and the third waterproof gaps B2, B3, is restricted by this first wall portion 55a. A predetermined gap is between the distal end of the first wall portion 55a and the spool 5 (flange 5b).

The second abutting member 61 abuts with the spool 5, disposed opposing the first abutting member 51. Specifically, the second abutting member 61 is positioned by the positioning portion 20a of the spool shaft 20 and the spool 5 and is mounted to the spool shaft 20. In this state, the second abutting member 61 is disposed at a predetermined interval from the first abutting member 51, for example, spaced apart by the predetermined first to the third waterproof gaps B1, B2, B3. A water repellent treatment is applied to the second abutting member 61.

The second abutting member 61 comprises a second body portion 63 and a plurality of second annular protrusions 65. The second body portion 63 can be abutted to the spool 5.

The second body portion 63 comprises a second disc portion 63a and a second abutting portion 63b. The second disc portion 63a is formed in a disc shape, and a second hole 63c is formed in the center thereof. The inner peripheral part of the second hole 63c is press fitted to the outer peripheral part of the spool shaft 20.

The second abutting portion 63b is a portion that abuts the spool 5. The second abutting portion 63b is integrally formed to the second disc portion 63a. Specifically, the second abutting portion 63b is formed in a cylindrical shape, and the inner peripheral part thereof configures the second hole 63c described above. The second abutting portion 63b protrudes from the second disc portion 63a toward the spool 5, in the first direction. The second abutting portion 63b is positioned by the positioning portion 20a of the spool shaft 20 and abuts the flange 5b of the spool 5.

A second stepped portion 64 (one example of a flow guide portion; one example of the second flow guide portion) is disposed on the second abutting portion 63b. The second stepped portion 64 can guide water that intrudes into the space S in the direction of gravity. Specifically, the second stepped portion 64 can guide the water that intrudes between the reel body 1 and the spool 5 around the spool shaft 20.

The second stepped portion 64 comprises a second opposing portion 64a (one example of the third wall portion) and a second bottom portion 64b. The second opposing portion 64a corresponds to the side surface of the spool 5 side of the second disc portion 63a. The second opposing portion 64a and the spool 5 form a predetermined second guide gap A2 in the first direction. Specifically, the second opposing portion 64a is disposed opposing the spool 5, for example, the flange 5b, in the first direction. A predetermined second guide gap A2 is thereby formed between the second opposing portion 64a and the flange 5b.

The second bottom portion 64b is disposed on the outer peripheral part of the second abutting portion 63b. That is, the second bottom portion 64b is disposed on the outer peripheral surface of the second abutting portion 63b. A second groove portion M2 is formed from the second bottom portion 64b, the second opposing portion 64a, and the flange 5b of the spool 5. The second groove portion M2 opens in the second direction, and has a groove shape along the outer peripheral part of the second abutting portion 63b. With this second groove portion M2, water that intrudes between the reel body 1 and the spool 5 is guided around the spool shaft 20.

A plurality of (for example, four) second annular protrusions 65 are integrally formed on the second body portion 63. Specifically, each of the plurality of second annular protrusions 65 protrudes from the second disc portion 63a of the second body portion 63. Each of the plurality of second annular protrusion 65 is disposed at a predetermined third waterproof gap B3 (one example of the second gap) from the first body portion 53 of the first abutting member 51 (first disc portion 53a).

Each of the plurality of second annular protrusions 65 is formed in an annular shape. The plurality of second annular protrusions 65 are concentric with respect to the rotational axis C, and they have different diameters from each other. In other words, each of the plurality of second annular protrusions 65 is formed with a different diameter, but with a concentric annular shape.

Each of the plurality of second annular protrusions 65 is integrally formed on the second disc portion 63a of the second body portion 63 at predetermined intervals in the second direction. The first annular protrusion 55 of the first abutting member 51 is adjacently disposed between second annular protrusions 65 that are adjacent to each other in the second direction. A predetermined second waterproof gap B2 described above is thereby disposed between the first annular protrusion 55 and the second annular protrusion 65 that are adjacent to each other in the second direction.

The outer diameter of the second annular protrusion 65 on the outermost side in the second direction (the second annular protrusion 65 with the maximum diameter) is smaller than the outer diameter of the first annular protrusion 55 with the maximum diameter. The second annular protrusion 65 with the maximum diameter is thereby disposed on the inner peripheral side of the first annular protrusion 55 with the maximum diameter in the second direction. That is, a first annular protrusion 55 and a second annular protrusion 65 that are adjacent to each other in the second direction are alternately disposed.

A second wall portion 65a that protrudes in the second direction is disposed on the second annular protrusion 65 with the maximum diameter. In other words, a second wall portion 65a that protrudes in the radial direction away from the rotational axis C of the spool shaft 20 is disposed on the second annular protrusion 65 with the maximum diameter. The second wall portion 65a restricts the intrusion of water between the first abutting member 51 and the second abutting member 61.

Specifically, the second wall portion 65a is formed in a flange-shape on the outer peripheral part of the second annular protrusion 65 with the maximum diameter, extending toward the first annular protrusion 55 with the maximum diameter. Intrusion of water into the second and the third waterproof gaps B2, B3 is restricted by this second wall portion 65a. A predetermined gap is between the distal end of the second wall portion 65a and the inner peripheral surface of the first annular protrusion 55 with the maximum diameter.

The labyrinth structure is configured by the above-described first abutting member 51 and the second abutting member 61. Here, this labyrinth structure is described based on the configuration described above.

Specifically, the first abutting member 51 can abut with the reel body 1 (side plate 15) at the first body portion 53 (first abutting portion 53b). The second abutting member 61 can abut with the spool 5 (flange 5b) at the second body portion 63 (second abutting portion 63b).

Here, the first body portion 53 of the first abutting member 51 (side surface on the spool 5 side) is disposed adjacent to the second annular protrusion 65, at a predetermined third waterproof gap B3 in the first direction. Additionally, the second body portion 63 of the second abutting member 61 (the surface opposing the first body portion 53) is disposed adjacent to the first annular protrusion 55, at a predetermined first waterproof gap B1 in the first direction.

Furthermore, the first annular protrusion 55 and the second annular protrusion 65 are adjacently disposed with the second waterproof gap B2 therebetween in the second direction. The second waterproof gap B2 is configured by the space between the distal end of the second wall portion 65a and the inner peripheral surface of the first annular protrusion 55 with the maximum diameter, and the space between the first annular protrusion 55 and the second annular protrusion 65.

In this manner, intrusion of water into the internal structure of the reel body 1 is restricted by the labyrinth structure that is configured by the first abutting member 51 and the second abutting member 61.

The seal member 71 restricts the intrusion of water into the internal structure of the reel body 1. The seal member 71 is disposed between the first abutting member 51 and the internal structure of the reel body 1. Specifically, the seal member 71 comprises a mounting portion 71a and a lip 71b. The mounting portion 71a is formed in an annular shape. The mounting portion 71a is mounted to the reel body 1. For example, the mounting portion 71a is clamped by the side plate 15 (side plate body 15a) and the mechanism mounting plate 19. The lip 71b extends from the mounting portion 71a toward the inner peripheral side, making contact with the outer peripheral part of the spool shaft 20. Accordingly, even when water passes through the labyrinth structure described above, this water is restricted by the seal member 71 so as to not intrude into the internal structure of the reel body 1 along the spool shaft 20.

For example, the gear mechanism 23, the clutch mechanism 25, the clutch control mechanism 27, the drag mechanism 29, and the casting control mechanism 31, etc. are included in the internal structure of the reel body 1.

The discharge hole 73 can discharge water that intrudes into the space S between the reel body 1 and the spool 5 outside of the reel body 1. For example, as shown in FIG. 4, water that intrudes into the space S is guided to the discharge hole 73 by the first groove portion M1 and the second groove portion M2, and is discharged from the discharge hole 73. The discharge hole 73 is disposed on the reel body 1. Specifically, the discharge hole 73 is formed on the tubular portion 16 of the side plate 15 (first tubular portion 16a). More specifically, the discharge hole 73 is formed on the rod mounting leg portion 4 side of the tubular portion 16 of the side plate 15 (first tubular portion 16a), that is, below the tubular portion 16 (first tubular portion 16a). Here, the discharge hole 73 is formed into a long hole shape that extends in the circumferential direction in the first tubular portion 16a of the tubular portion 16.

Characteristics

The embodiment described above can be expressed as the following.

(A) The waterproof structure 50 comprises a reel body 1, a spool 5, a first abutting member 51, and a second abutting member 61. The spool 5 is provided to rotate with respect to the reel body 1, with the rotational axis C of the spool shaft 20 as the center. The first abutting member 51 comprises a first body portion 53 and at least one first annular protrusion 55. The first body portion 53 can be abutted to the reel body 1. The first annular protrusion 55 protrudes from the first body portion 53. The second abutting member 61 comprises a second body portion 63 and at least one second annular protrusion 65. The second body portion 63 can abut with the spool 5 and is adjacently disposed at a predetermined first waterproof gap B1 from the first annular protrusion 55. The second annular protrusion 65 protrudes from the second body portion 63 and is adjacently disposed at a predetermined third waterproof gap B3 from the first body portion 53. The first annular protrusion 55 and the second annular protrusion 65 are adjacently disposed with a predetermined second waterproof gap B2 therebetween.

In the waterproof structure 50 of the present fishing reel, the first abutting member 51 can abut with the reel body 1 at the first body portion 53. The second abutting member 61 can be abutted to the spool 5 at the second body portion 63. Here, the first body portion 53 of the first abutting member 51 is disposed adjacent to the second annular protrusion 65, at a predetermined second gap from the second annular protrusion 65. Additionally, the second body portion 63 of the second abutting member 61 is disposed adjacent to the first annular protrusion 55, at a predetermined first waterproof gap B1 from the first annular protrusion 55. Furthermore, the first annular protrusion 55 and the second annular protrusion 65 are adjacently disposed with a predetermined second waterproof gap B2 therebetween.

In this manner, first to third waterproof gaps B1, B2, B3 can be disposed between the first abutting member 51 and the second abutting member 61 by forming a first annular protrusion 55 in the first body portion 53 of the first abutting member 51 and forming a second annular protrusion 65 in the second body portion 63 of the second abutting member 61. Fluid that intrudes between the reel body 1 and the spool 5 (space S) can thereby be waterproofed. That is, a waterproof structure 50 can be easily realized by simply forming a first annular protrusion 55 in the first body portion 53 of the first abutting member 51 and forming a second annular protrusion 65 in the second body portion 63 of the second abutting member 61.

(B) In the waterproof structure 50, a water repellent treatment is applied to at least one of the first abutting member 51 or the second abutting member 61.

In this embodiment, since a water repellent treatment is applied to at least one of the first abutting member 51 or the second abutting member 61, fluid has difficulty intruding into the first to the third waterproof gaps B1, B2, B3 between the first abutting member 51 and the second abutting member 61. That is, the waterproof effect of the waterproof structure 50 can be improved.

(C) In the waterproof structure 50, the first annular protrusion 55 and the second annular protrusion 65 are formed in a different diameter concentric annular shape, which is concentric around a rotational axis C of the spool shaft 20, having different diameters from each other.

In this embodiment, since the first annular protrusion 55 and the second annular protrusion 65 are formed in an annular shape, the first annular protrusion 55 and the second annular protrusion 65 can be easily formed. Furthermore, since the first annular protrusion 55 and the second annular protrusion 65 are concentric around a rotational axis C of the spool shaft 20 and have different diameters from each other, the first annular protrusion 55 and the second annular protrusion 65 can be easily disposed adjacently, alternately in the radial direction. That is, the first annular protrusion 55 and the second annular protrusion 65 can be easily assembled.

(D) In the waterproof structure 50, a wall portion (first wall portion 55a, second wall portion 65a) that protrudes in the radial direction away from the rotational axis C of the spool shaft 20 is disposed at least one of the first annular protrusion 55 with the maximum diameter or the second annular protrusion 65 with the maximum diameter.

In this embodiment, fluid that intrudes between the reel body 1 and the spool 5 (space S) becomes less likely to intrude into the first to the third waterproof gaps B1, B2, B3 due to the wall portion that protrudes in the radial direction. That is, the intrusion of fluid into the first to the third waterproof gaps B1, B2, B3 can be restricted.

(E) In the waterproof structure 50, stepped portions (first stepped portion 54, second stepped portion 64), which guide the fluid that intrudes between the reel body 1 and the spool 5 (space S) in the direction of gravity, are provided to at least one of the first abutting member 51 or the second abutting member 61.

In this embodiment, since fluid that intrudes between the reel body 1 and the spool 5 (space S) can be guided in the direction of gravity by the stepped portions (first stepped portion 54, second stepped portion), intrusion of fluid into the first to the third waterproof gaps B1, B2, B3 can be restricted.

(F) In the waterproof structure 50, the stepped portions (first stepped portion 54, second stepped portion 64) are provided to at least one of the first body portion 53 or the second body portion 63.

In this embodiment, since fluid between the reel body 1, the spool 5, and the first body portion 53 and/or the second body portion 63 can be guided in the direction of gravity via the second flow guide portion, intrusion of fluid into the first to the third waterproof gaps B1, B2, B3 can be reliably restricted.

(G) In the waterproof structure 50, the first body portion 53 further comprises a first abutting portion 53b that abuts the reel body 1. The second body portion 63 further comprises a second abutting portion 63b that abuts the spool 5. The stepped portions (first stepped portion 54, second stepped portion 64) are provided to at least one of the first abutting portion 53b or the second abutting portion 63b.

In this embodiment, fluid between the reel body 1, the spool 5, and the first abutting portion 53b and/or the second abutting portion 63b can be guided in the direction of gravity via the stepped portions (first stepped portion 54, second stepped portion 64). The intrusion of fluid into the first to the third waterproof gaps B1, B2, B3 can thereby be more reliably restricted.

(H) In the waterproof structure 50, the reel body 1 further comprises a discharge hole 73. The discharge hole 73 discharges the fluid that is guided by the stepped portions (first stepped portion 54, second stepped portion 64) to the outside of the reel body 1.

In this embodiment, the fluid that is guided by the stepped portions (first stepped portion 54, second stepped portion 64) is discharged outside of the reel body 1 via the discharge hole 73. The intrusion of fluid into the first to the third waterproof gaps B1, B2, B3 can thereby be more reliably restricted.

Other Embodiments

One embodiment of the present invention was described above, but the present invention is not limited to the above-described embodiment; various modifications can be made without departing from the scope of the invention.

Figure 5:
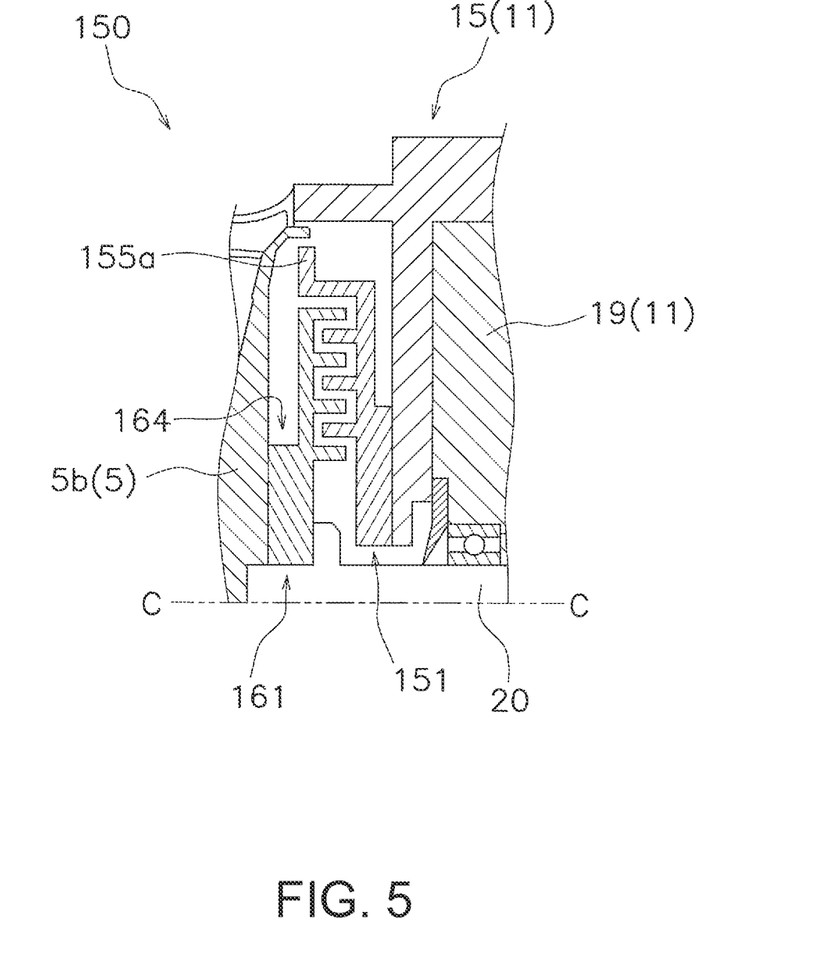
FIG. 5 is a partial cross-sectional view showing the waterproof structure of another embodiment of the present invention (figure corresponding to FIG. 3).

(a) In the embodiment described above, an example was discussed in which the first abutting member 51 comprises the first stepped portion 54 and the second abutting member 61 comprises the second stepped portion 64; however, a stepped portion may be disposed on either the first abutting member 51 or the second abutting member 61. For example, as an example of this embodiment, as shown in FIG. 5, in the waterproof structure 150, only the second abutting member 161 may comprise a stepped portion 164. The configuration of the stepped portion 164 is the same as the configuration of the second stepped portion 64 of the embodiment described above. Furthermore, in this embodiment, a stepped portion is not disposed on the first abutting member 151. In FIG. 5, the configurations that are the same as those in the embodiment described above are given the same reference codes.

(b) In the embodiment described above, an example was discussed in which the first abutting member 51 comprises the first wall portion 55*a* and the second abutting member 61 comprises the second wall portion 65*a*; however, a wall portion may be disposed on either the first abutting member 51 or the second abutting member 61. For example, as an example of this embodiment, as shown in FIG. 5, in the waterproof structure 150, only the first abutting member 151 may comprise a wall portion 155*a*. The configuration of the wall portion 155*a* is the same as the configuration of the first wall portion 55*a* of the embodiment described above. Furthermore, in this embodiment, a wall portion is not disposed on the second abutting member 161. In FIG. 5, the configurations that are the same as those in the embodiment described above are given the same reference codes.

(c) In the embodiment described above, an example was discussed in which the seal member 71 is disposed between the first abutting member 51 and the internal structure of the reel body 1; however, the waterproof structure 50 can be configured without using this seal member 71. By configuring the waterproof structure 50 in this way, a waterproof structure 50 can be realized via a simpler configuration.

Figure 6A:
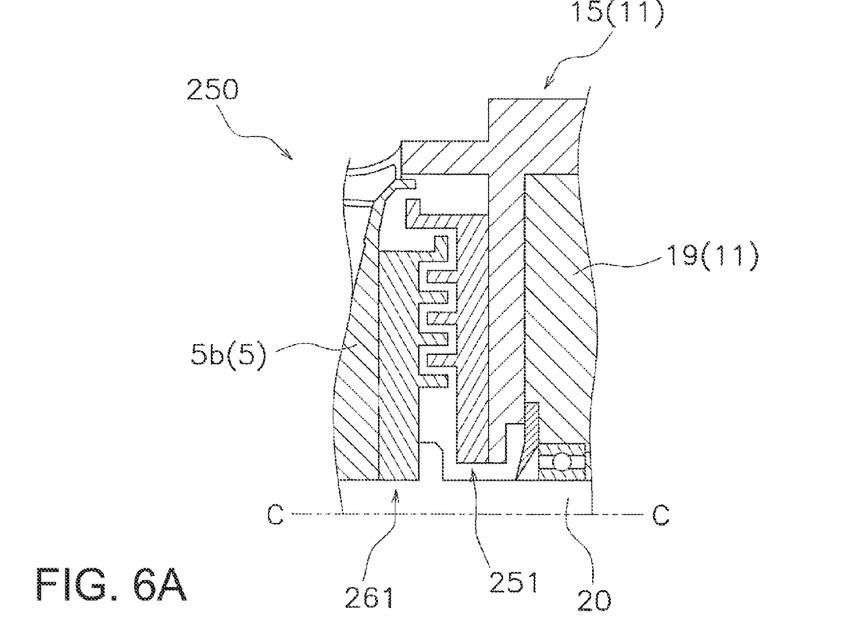
FIG. 6A is a partial cross-sectional view showing the waterproof structure of another embodiment of the present invention (figure corresponding to FIG. 3).
Figure 6B:
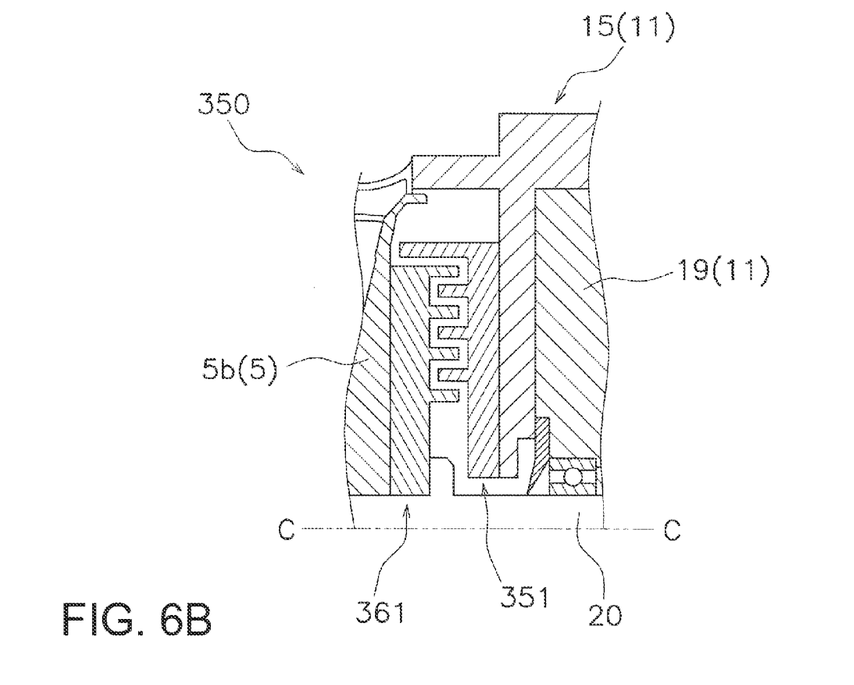
FIG. 6B is a partial cross-sectional view showing the waterproof structure of another embodiment of the present invention (figure corresponding to FIG. 3).

(d) In the embodiment described above, an example was discussed in which the first abutting member 51 and the second abutting member 61 comprise stepped portions (first stepped portion 54, second stepped portion 64). Alternatively, as shown in FIG. 6A, a waterproof structure 250 can be configured without stepped portions on the first abutting member 251 and the second abutting member 261. In addition, as shown in FIG. 6B, a waterproof structure 350 may be configured without the wall portions of the embodiment described above (first wall portion 55*a*, second wall portion 65*a*) on the first abutting member 351 and the second abutting member 361.

By forming the waterproof structures 250, 350 in this way, the waterproof structures 250, 350 can be realized via a simpler configuration. In FIG. 6A and FIG. 6B, the configurations that are the same as those in the embodiment described above are given the same reference codes.

Figure 7:
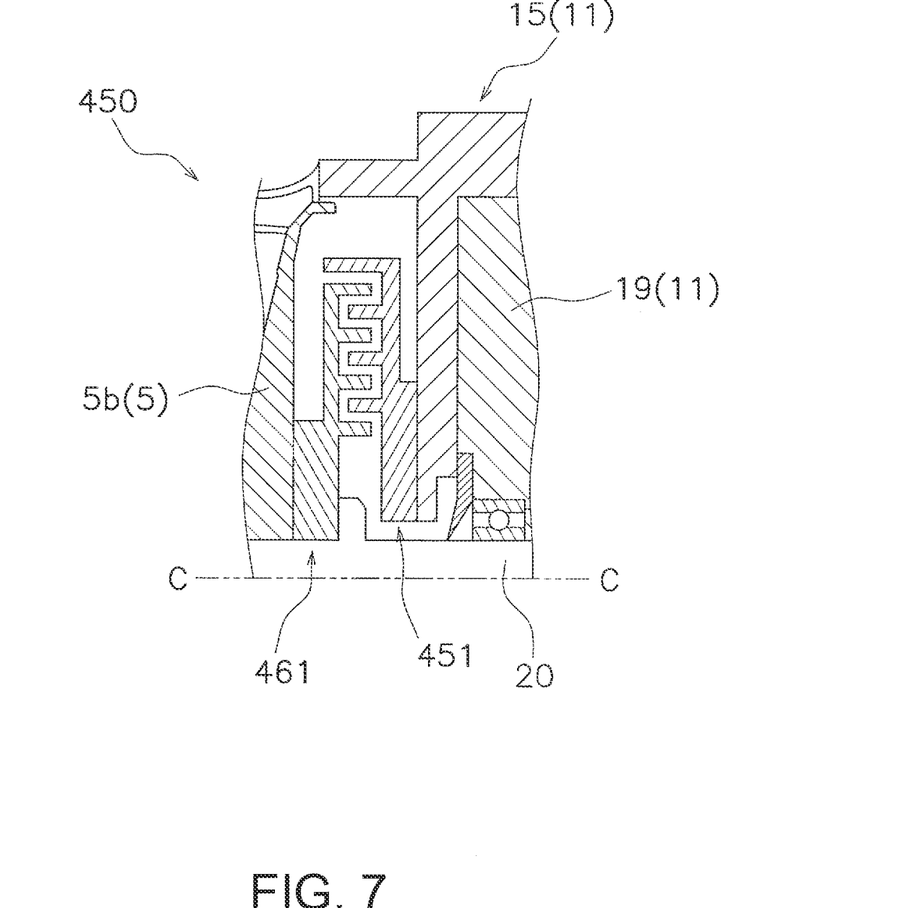
FIG. 7 is a partial cross-sectional view showing the waterproof structure of another embodiment of the present invention (figure corresponding to FIG. 3).

(e) In the embodiment described above, an example was discussed in which the first abutting member 51 and the second abutting member 61 comprise wall portions (first wall portion 55*a*, second wall portion 65*a*). Alternatively, as shown in FIG. 7, a waterproof structure 450 can be configured without this wall portion on the first abutting member 451 and the second abutting member 461. By forming the waterproof structure 450 in this way, a waterproof structure 450 can be realized via a simpler configuration. In FIG. 7, the configurations that are the same as those in the embodiment described above are given the same reference codes.

(f) In the embodiment described above, an example was discussed in which the first abutting member 51 and the second abutting member 61 comprise stepped portions (first stepped portion 54, second stepped portion 64); however, the first abutting member 51 and the second abutting member 61 may comprise at least one recess (one example of a flow guide portion; one example of the first flow guide portion).

Figure 8:
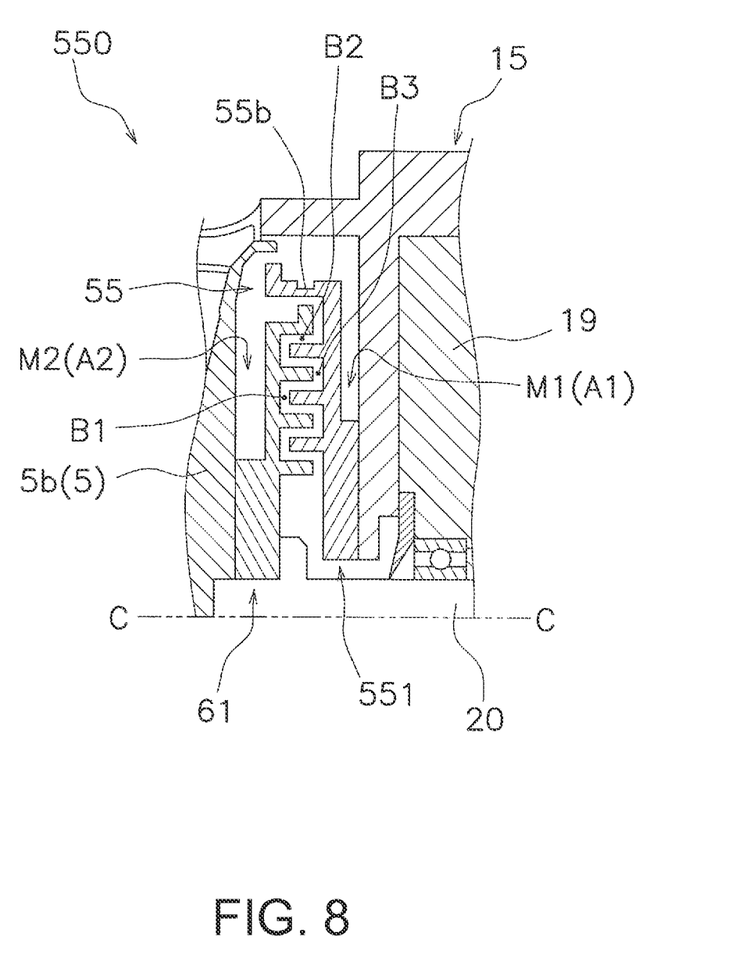
FIG. 8 is a partial cross-sectional view showing the waterproof structure of another embodiment of the present invention (figure corresponding to FIG. 3).

In this embodiment, the waterproof structure 550 can be formed as shown in FIG. 8. In FIG. 8, configurations that are the same as those in the embodiment described above are given the same reference codes.

For example, as shown in FIG. 8, a recess 55*b* is disposed in the first annular protrusion 55 with the maximum diameter of the first abutting member 551. More specifically, the recess 55*b* is formed in a groove shape and is formed on the outer peripheral part of the first annular protrusion 55 with the maximum diameter around the spool shaft 20. By forming a recess 55*b* in the first abutting member 551 in this way, the fluid on the outer peripheral surface of the first annular protrusion 55 with the maximum diameter can be guided in the direction of gravity. Intrusion of fluid into the first groove portion M1 (first guide gap A1) and/or the second groove portion M2 (second guide gap A2) and into the first to the third waterproof gaps B1, B2, B3 can be reliably restricted.

Here, an example has been discussed in which a recess 55*b* is disposed in the first abutting member 551, but a recess may also be disposed in the second annular protrusion 65 with the maximum diameter (outer peripheral part) of the second abutting member 61. In this embodiment, intrusion of fluid into the second groove portion M2 (second guide gap A2) and into the first to the third waterproof gaps B1, B2, B3 can be more reliably restricted.

Furthermore, a recess may also be disposed only in the second annular protrusion 65 with the maximum diameter (outer peripheral part) of the second abutting member 61. In this embodiment, the intrusion of fluid into the first to the third waterproof gaps B1, B2, B3 can be more reliably restricted.

(g) In the above-described embodiment, an example was discussed in which a waterproof structure 50, 150, 250, 350, 450, 550 is used in a dual-bearing reel, but a waterproof structure 650 may also be used in a spinning reel.

Figure 9:
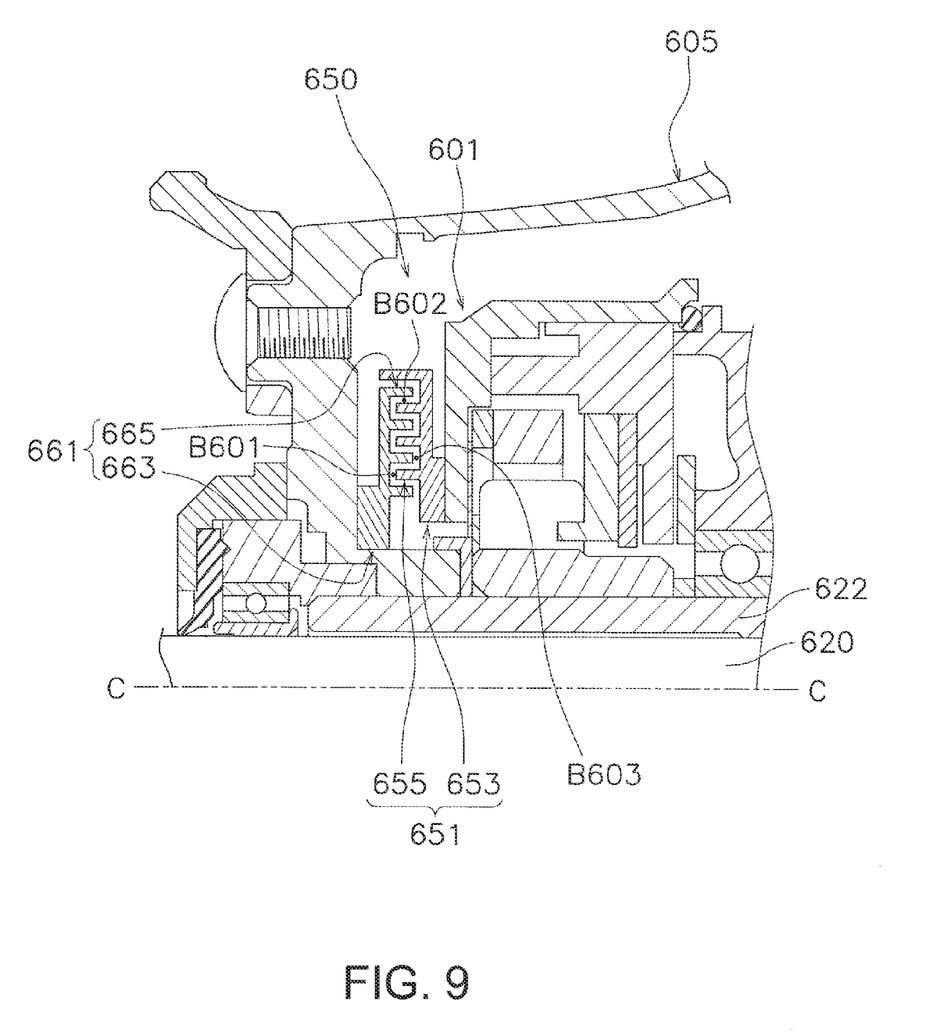
FIG. 9 is a partial cross-sectional view showing the waterproof structure of another embodiment of the present invention.

For example, as shown in FIG. 9, a waterproof structure 650 of a spinning reel comprises a reel body 601, a rotor 605 (one example of a rotating member), a first abutting member 651, and a second abutting member 661. The rotor 605 rotates with respect to the reel body 601, with the rotational axis C as the center. The rotational axis C corresponds to the rotational axis of a spool shaft 620 (pinion gear 622).

The first abutting member 651 comprises a first body portion 653 and at least one first annular protrusion 655. The first body portion 653 can abut with the reel body 601. Specifically, the first body portion 653 is mounted to the reel body 601. Here, for example, a plurality of (for example, four) first annular protrusions 655 protrude from the first body portion 653.

The second abutting member 661 comprises a second body portion 663 and at least one second annular protrusion 665. The second body portion 663 can abut with the rotor 605. Specifically, the second body portion 663 is mounted to the rotor 605. Furthermore, the second body portion 663 is disposed adjacent to the first annular protrusion 655 with a first waterproof gap B601 (one example of the first gap) therebetween. Here, a plurality of (for example, four) second annular protrusions 665 protrude from the second body portion 663. The second annular protrusion 665 is disposed adjacent to the first body portion 653 with a second waterproof gap B603 (one example of the second gap) therebetween. The first annular protrusion 655 and the second annular protrusion 665 are adjacently disposed with a third waterproof gap B602 (one example of the third gap) therebetween.

The present invention can be widely applied to a fishing reel.

What is claimed is:

1. A waterproof structure for a fishing reel, comprising
a reel body;
a rotating member configured to rotate around a rotational axis with respect to the reel body;
a first abutting member comprising a first body portion configured to abut the reel body and at least one first annular protrusion; and
a second abutting member comprising a second body portion configured to abut the rotating member and being adjacently disposed at a predetermined first gap from the first annular protrusion, and at least one second annular protrusion protruding from the second body portion and being adjacently disposed at a predetermined second gap from the first body portion,
the first annular protrusion and the second annular protrusion being adjacently disposed with a predetermined third gap therebetween.

2. The waterproof structure for a fishing reel recited in claim 1, wherein
at least one of the first abutting member or the second abutting member has a water repellent treatment applied thereto.

3. The waterproof structure for a fishing reel recited in claim 1, wherein
the first annular protrusion and the second annular protrusion have concentric annular shapes, the first annular protrusion and the second annular protrusion being concentric around a rotational axis, and the first annular protrusion and the second annular protrusion having diameters different from each other.

4. The waterproof structure for a fishing reel recited in claim 1, further comprising
a wall portion protruding in a radial direction away from the rotational axis, and being disposed on at least one of the first annular protrusion at a maximum diameter and the second annular protrusion at a maximum diameter.

5. The waterproof structure for a fishing reel recited in claim 1, further comprising
a flow guide portion configured to guide a fluid that intrudes between the reel body and the rotating member in the direction of gravity, and being disposed on at least one of the first abutting member and the second abutting member.

6. The waterproof structure for a fishing reel recited in claim 5, wherein
the flow guide portion comprises a first flow guide portion disposed on an outer peripheral surface of at least one of the first annular protrusion at a maximum diameter and the second annular protrusion at a maximum diameter.

7. The waterproof structure for a fishing reel recited in claim 5, wherein
the flow guide portion comprises a second flow guide portion disposed on at least one of the first body portion and the second body portion.

8. The waterproof structure for a fishing reel recited in claim 7, wherein
the first body portion comprises a first abutting portion abutting the reel body,
the second body portion comprises a second abutting portion abutting the rotating member, and
the second flow guide portion is disposed on at least one of the first abutting portion and the second abutting portion.

9. The waterproof structure for a fishing reel recited in claim 5, wherein
the reel body comprises a discharge portion configured to discharge the fluid that is guided by the flow guide portion to an outside of the reel body.

* * * * *